United States Patent [19]
Ingenio et al.

[11] Patent Number: 6,047,361
[45] Date of Patent: Apr. 4, 2000

[54] MEMORY CONTROL DEVICE, WITH A COMMON SYNCHRONOUS INTERFACE COUPLED THERETO, FOR ACCESSING ASYNCHRONOUS MEMORY DEVICES AND DIFFERENT SYNCHRONOUS DEVICES

[75] Inventors: Giacomo Vincent Ingenio, Poughkeepsie; Russell William Lavallee, Legrangeville; William Wu Shen, Poughkeepsie, all of N.Y.

[73] Assignee: International Business Machines Corporation, Armonk, N.Y.

[21] Appl. No.: 08/701,228

[22] Filed: Aug. 21, 1996

[51] Int. Cl.⁷ .............................. G06F 13/00; G06F 12/00
[52] U.S. Cl. .............................. 711/167; 711/5; 711/170; 365/233; 395/500
[58] Field of Search ........................ 711/104, 105, 711/5, 167, 170, 172; 365/52, 233; 395/551, 500

[56] References Cited

U.S. PATENT DOCUMENTS

| | | | |
|---|---|---|---|
| 4,562,532 | 12/1985 | Nishizawa et al. | 711/170 |
| 4,615,017 | 9/1986 | Finlay et al. | 713/400 |
| 4,878,174 | 10/1989 | Watkins et al. | 712/245 |
| 5,155,819 | 10/1992 | Watkins et al. | 712/36 |
| 5,172,341 | 12/1992 | Amin | 365/222 |
| 5,179,667 | 1/1993 | Iyer | 711/167 |
| 5,187,779 | 2/1993 | Jeddeloh et al. | 710/128 |
| 5,218,686 | 6/1993 | Thayer | 711/100 |
| 5,265,243 | 11/1993 | Povenmire et al. | 710/62 |
| 5,307,320 | 4/1994 | Farrer et al. | 365/230.01 |
| 5,341,495 | 8/1994 | Joyce et al. | 395/500 |
| 5,396,428 | 3/1995 | Tichborne et al. | 701/13 |
| 5,418,924 | 5/1995 | Dresser | 711/167 |
| 5,424,655 | 6/1995 | Chua | 326/40 |
| 5,428,809 | 6/1995 | Coffin et al. | 712/233 |
| 5,477,167 | 12/1995 | Chua | 326/41 |
| 5,684,978 | 11/1997 | Sarma et al. | 711/105 |
| 5,696,917 | 12/1997 | Mills et al. | 711/105 |
| 5,721,860 | 2/1998 | Stolt et al. | 711/105 |
| 5,813,023 | 9/1998 | McLaury | 711/105 |

*Primary Examiner*—Glenn Gossage
*Attorney, Agent, or Firm*—Marc A. Ehrlich, Esq.; Heslin & Rothenberg, P.C.

[57] ABSTRACT

A memory control device, having a common synchronous interface coupled thereto, for accessing asynchronous memory devices, as well as other synchronous devices. The memory control device receives, via the synchronous interface, a command having a synchronous format, and translates at least a portion of the command from the synchronous format to an asynchronous format. The command in the asynchronous format is then used to access an asynchronous memory device. The asynchronous memory device can have one of various formats, each of which is supported by the memory control device. The memory control device emulates synchronous memory devices for the system memory controller coupled to the memory control device, even when asynchronous devices are accessed. The memory control device can also translate commands from one synchronous format to another synchronous format such that memory devices of the another synchronous format can be accessed.

28 Claims, 8 Drawing Sheets

LOGICAL VIEW A

MEMORY CONTROL DEVICE, WITH A COMMON SYNCHRONOUS INTERFACE COUPLED THERETO, FOR ACCESSING ASYNCHRONOUS MEMORY DEVICES AND DIFFERENT SYNCHRONOUS DEVICES

TECHNICAL FIELD

This invention relates, in general, to devices for controlling access to memory, and in particular, to a memory control device, which translates synchronous commands received via a synchronous bus into asynchronous commands usable in accessing asynchronous memory devices as well as other synchronous devices.

BACKGROUND ART

Modern high speed processors are demanding higher performance and higher capacities from their main storage subsystems at the same time that price competition is forcing computer manufacturers to tightly control production costs. Dynamic random access memory (DRAM) producers are responding to the performance need by expanding upon the basic fast-page mode (FPM) architecture that has been prevalent in the industry, and whose stability has produced commodity pricing, into a confusing explosion of new architectures, such as Synchronous DRAM (SDRAM), Extended-Data-Out (EDO) and BurstEDO. For a period of time, until stability returns to the DRAM market, there will be uncertainty as to the future price and availability of these competing architectures.

This explosion of varied and new architectures for system memory has caused instability for system memory controller designers who must bet on which architecture is going to win the competition and become the industry standard. Since the architectures are radically different and a system memory controller designed for one architecture typically does not operate with others, the incorrect choice could result in lower profit margins, constrained shipments due to DRAM allocation, or delayed shipments due to redesign for another DRAM type.

In an attempt to ward off the dangers of selecting the wrong architecture, system memory controllers are being designed with multiple, different DRAM interfaces. However, there are three (3) major disadvantages to this solution:

1. The system memory controller design is more complex. All modes must be simulated and tested, which adds to the design time and adds functionality risk.
2. Given a finite system memory controller resource, the extra mode support may limit the optimization of other controller functions that have greater impact to system performance than does the memory interface.
3. Memory performance may vary greatly, depending upon which DRAM architecture is attached due to the variation in bandwidth inherent in the device protocols. Thus, system performance varies accordingly—a competitive problem.

Based on the foregoing, a need exists for a mechanism which enables a system memory controller to be designed with a single common interface, yet usable in accessing multiple types of memory devices. Additionally, a need exists for a mechanism which enables a system memory controller to be designed without regard for the type of memory device to be accessed by the controller. Further, a need exists for a mechanism that enables a system memory controller to be designed in such a manner that the disadvantages described above are eliminated. Yet further, a need exists for a mechanism which enables a system memory controller to be designed with optimum performance, cost and stability.

SUMMARY OF THE INVENTION

The shortcomings of the prior art are overcome and additional advantages are provided through the provision of a memory control device, which enables the design of a system memory controller having a single common interface usable in accessing multiple types of memory devices.

In one example, the memory control device includes a translator and an access unit coupled thereto. The translator is adapted to translate at least a part of a command received in a synchronous format from the synchronous format to an asynchronous format, and the access unit is adapted to provide access to an asynchronous memory device using the command in the asynchronous format.

In a further embodiment of the invention, a synchronous interface is coupled to the memory control device, which provides the synchronous command to the device.

In yet a further embodiment of the invention, the memory control device includes means for providing one or more configuration parameters to the translator. The one or more configuration parameters define for the translator the asynchronous memory device to be accessed. The asynchronous memory device can include, for example, a dynamic random access memory device, examples of which include a fast page mode DRAM device, an Extended-Data-Out memory device and a hyperpage mode DRAM device.

In another aspect of the invention, a computing apparatus is provided, which includes a processor; an interface coupled to the processor, which is adapted to receive from the processor, a command having a synchronous format; a memory control device coupled to the interface to receive the command and to translate at least a portion of the command from the synchronous format to an asynchronous format; and one or more asynchronous memory devices coupled to the memory control device, wherein one of the asynchronous memory devices is accessible by the command in the one asynchronous format.

In yet a further aspect of the invention, a method for accessing an asynchronous memory device is provided. At least a portion of a command received in a synchronous format is translated from the synchronous format to an asynchronous format, and then the command in the asynchronous format is used to access an asynchronous memory device.

In one embodiment, the command includes an address and the translating includes mapping the address from the synchronous format to the asynchronous format.

In another aspect of the present invention, an apparatus for controlling access to memory devices is provided. The apparatus includes a memory controller configured for a single memory architecture, and a memory control device coupled to the memory controller. The memory control device is adapted to access a first memory device corresponding to the single memory architecture and a second memory device corresponding to another memory architecture.

In one embodiment, the single memory architecture includes a synchronous architecture and the another memory architecture includes either an asynchronous architecture or a different synchronous architecture.

In a further embodiment of the invention, the memory control device includes a translator adapted to translate at least a portion of a command having a first format corresponding to the single memory architecture from the first format to a second format corresponding to the another memory architecture.

In yet another aspect of the invention, a memory control device is provided. The memory control device includes a command input unit adapted to receive a synchronous memory access command, and an access unit coupled to the command input unit, which is adapted to access an asynchronous memory device using the synchronous memory access command.

The memory control device of the present invention advantageously enables a system memory controller to be designed with a single common interface, thereby enabling standardization of controller-to-memory architecture. Optimum performance, cost and stability can be achieved by designing the system memory controller to a single preferred high performance architecture and introducing a smart application specific integrated circuit (ASIC) (e.g., the memory control device of the present invention) into the memory subsystem to convert the fixed protocol (i.e., the synchronous protocol) into a protocol required of any of various asynchronous (e.g., DRAM) or other synchronous devices. Since the system memory controller can be designed with a single common interface, the disadvantages described above are eliminated, yet the guesswork is taken out of deciding which architecture should be used in designing the system memory controller.

The memory control device of the present invention further allows denser packaging without impacting performance; enables memory to still be treated as a commodity despite a fragmented memory market; and converts the memory options from an undesirable cost/performance option to a more competitive cost/granularity option at constant performance and minimum cost.

Additional features and advantages are realized through the mechanisms of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

In accordance with the principles of the present invention, a memory control device is provided, which receives a command in a synchronous format and uses that command to access asynchronous memory devices. In particular, the memory control device translates at least a portion of the command from the synchronous format to an asynchronous format, and then uses the command in the asynchronous format to access an asynchronous memory device coupled to the memory control device. Further, in accordance with the principles of the present invention, the memory control device can receive a command in one synchronous format and use that command to access memory devices corresponding to different synchronous formats.

The memory control device of the present invention can be used within a variety of computing environments and with various computer systems. In one embodiment, the memory control device of the present invention can be incorporated and used in a computer system based on the Enterprise Systems Architecture (ESA)/390 offered by International Business Machines Corporation (Armonk, N.Y.), such as the ES/9000 System.

Figure 1:
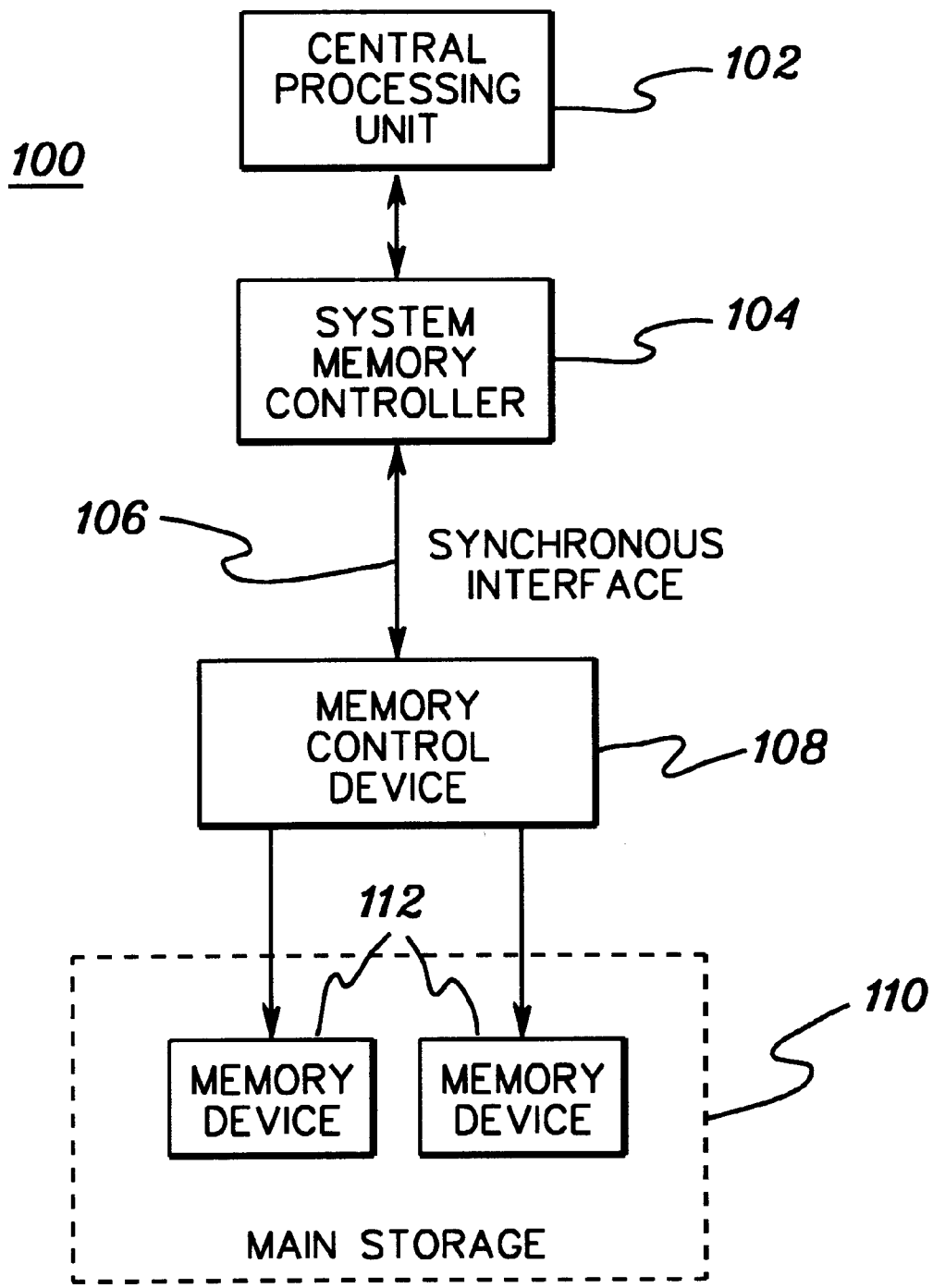
FIG. 1 depicts one example of a computing apparatus incorporating and using the memory control device of the present invention.

One example of a computer system 100 incorporating and using the present invention is depicted in FIG. 1. In one instance, computer system 100 includes a central processing unit 102, a system memory controller 104, a memory control device 108, and a main storage 110, each of which is described in detail below.

Central processing unit 102 is the controlling center of system 100. It executes at least one operating system (not shown), which controls the execution of programs and the processing of data, as is well known. Coupled to central processing unit 102 is system memory controller 104. System memory controller 104 manages, for example, the transfer of information between main storage 110 and caches (not shown) of the central processing unit. In particular, system memory controller 104 receives commands from the central processing unit, which will ultimately be used to access the main storage. In one example, system memory controller 104 is designed in a high performance synchronous architecture, such as a synchronous dynamic random access memory (SDRAM) architecture.

System memory controller 104 is coupled, in accordance with the principles of the present invention, to memory control device 108 via a synchronous interface 106. In one embodiment, synchronous interface 106 is a synchronous dynamic random access memory (SDRAM) bus that provides synchronous commands (and data) from system memory controller 104 to memory control device 108. The synchronous interface used herein specifically accommodates, for instance, industry standard synchronous DRAM timing as a subset of the synchronous command/data interface so that industry standard synchronous DRAM may be attached directly to the memory control device without requiring a change in the system memory controller.

The memory control device of the present invention, which is described in further detail below, receives the synchronous commands and uses those commands to access the main storage coupled thereto. (In one embodiment, the memory control device and the main storage are included on a single primary memory array (PMA) card; however, this is not necessary).

The synchronous commands are used to access one or more memory devices 112 of main storage 110. In accordance with the principles of the present invention, main storage can include synchronous memory devices, such as SDRAM, RAMBUS® (Rambus, Inc., Mountain View, Calif.), or SYNCLINK® (Microgate Corp., North Austin, Tex.) devices and/or asynchronous memory dies, such as DRAM devices, for example, fast page mode DRAM devices, Extended-Data-Out (EDO) memory devices, or hyperpage mode DRAM devices, to name a few. The particular memory device to be accessed is based on configuration parameters input to memory control device 108, as described in further detail below.

It will be apparent to those skilled in the relevant art that the computer system depicted in FIG. 1 and described above is only one example. The present invention can be used within other computing environments and with other systems without departing from the spirit of the present invention. For instance, in another embodiment, a card controller can be coupled between system memory controller 104 and memory control device 108, via a synchronous interface, to provide additional bandwidth. Other additions and modifications can also be made without departing from the spirit of the present invention.

Figure 2A:
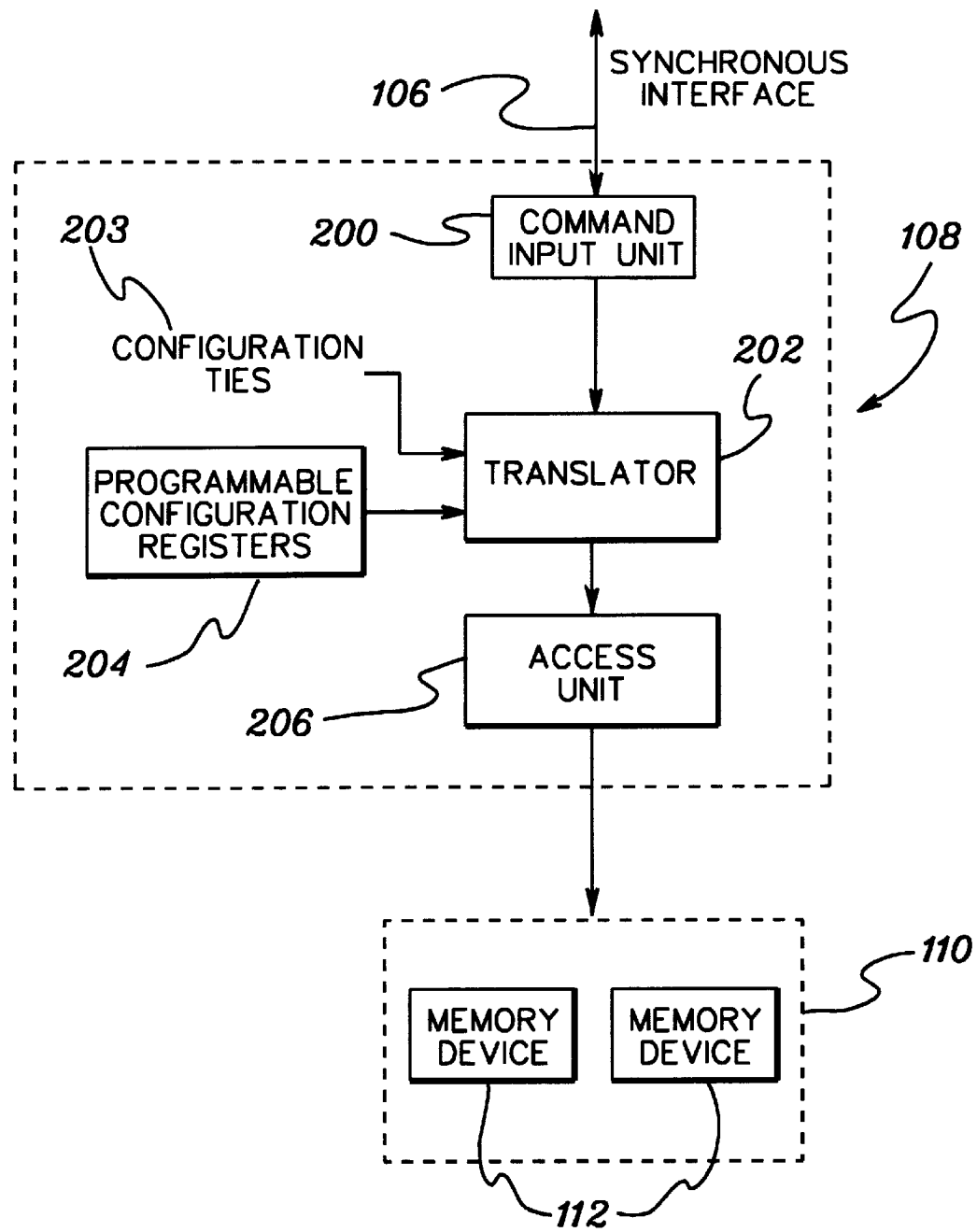
FIG. 2a depicts one embodiment of the memory control device of FIG. 1, in accordance with the principles of the present invention.

One example of memory control device 108 is described in further detail below with reference to FIG. 2a. In one embodiment, memory control device 108 includes a command input unit 200, which receives commands, via synchronous interface 106, to be used in accessing memory devices 112. Each received command is in a synchronous format, such as an SDRAM format, and includes a number of components including, for instance, a command code, an address of the memory location to be accessed (part of which is a bank address, one or more chip select addresses and one or more extent select addresses), and a clock. (An extent is an independently addressable, controllable unit of memory.) The command code can represent a number of different memory operations including, for instance, initial program load (IPL), activate, read, write, bank activate, refresh, self-refresh, back-to-back overlapping stores, pre-charge, and auto pre-charge, as several examples. It will be apparent to those skilled in the relevant art, that these operations are only exemplary and that many other operations can be supported without departing from the spirit of the present invention.

Coupled to command input unit 200 is a translator 202, which is used, in accordance with the principles of the present invention, to translate the synchronous command (i.e., e.g., the address portion of the command), into an asynchronous command (i.e., the command format is asynchronous), when the memory device to be accessed is an asynchronous memory device. In addition, the translator can translate the synchronous command from one type of synchronous command (such as SDRAM) to another type of synchronous command (such as SYNCLINK®), when the device to be accessed is another type of synchronous device. The translator is provided with the type of memory device to be accessed by one or more configuration ties 203, which is input to translator 202. In one embodiment, the configuration ties indicate the memory type, such as synchronous or asynchronous, as well as provide the size of the memory (e.g., 16 megabytes, 64 megabytes, etc.). Additionally, the configuration ties indicate the particular type of synchronous or asynchronous device, such as SDRAM, and DRAM, (e.g., Extended-Data-Out, Fast Page Mode), as examples.

The translator receives additional information regarding the memory device to be accessed via one or more programmable configuration registers 204 coupled to the translator. The programmable configuration registers 204 include, for example, information relating to access, such as the type of access (e.g., Burst 2, Burst 4, etc.), as well as addressing information, such as the number of banks and/or interleaves that make up each device, timing information and address setup information. Address setup information includes, for instance, values for a row address setup limit, a column address setup limit, a Row Address Strobe (RAS) and Column Address Strobe (CAS) delay limit and a CAS pulse width limit, each of which is described in further detail with reference to FIG. 4. The configuration registers are loaded when an initial program load (IPL) command is received by the memory control device over the synchronous interface. The IPL command includes the data to be stored in the registers.

Translator 202 is further coupled to access unit 206, which receives the command, either in a synchronous format or an asynchronous format, and uses that command to access the appropriate memory device.

Figure 2B:
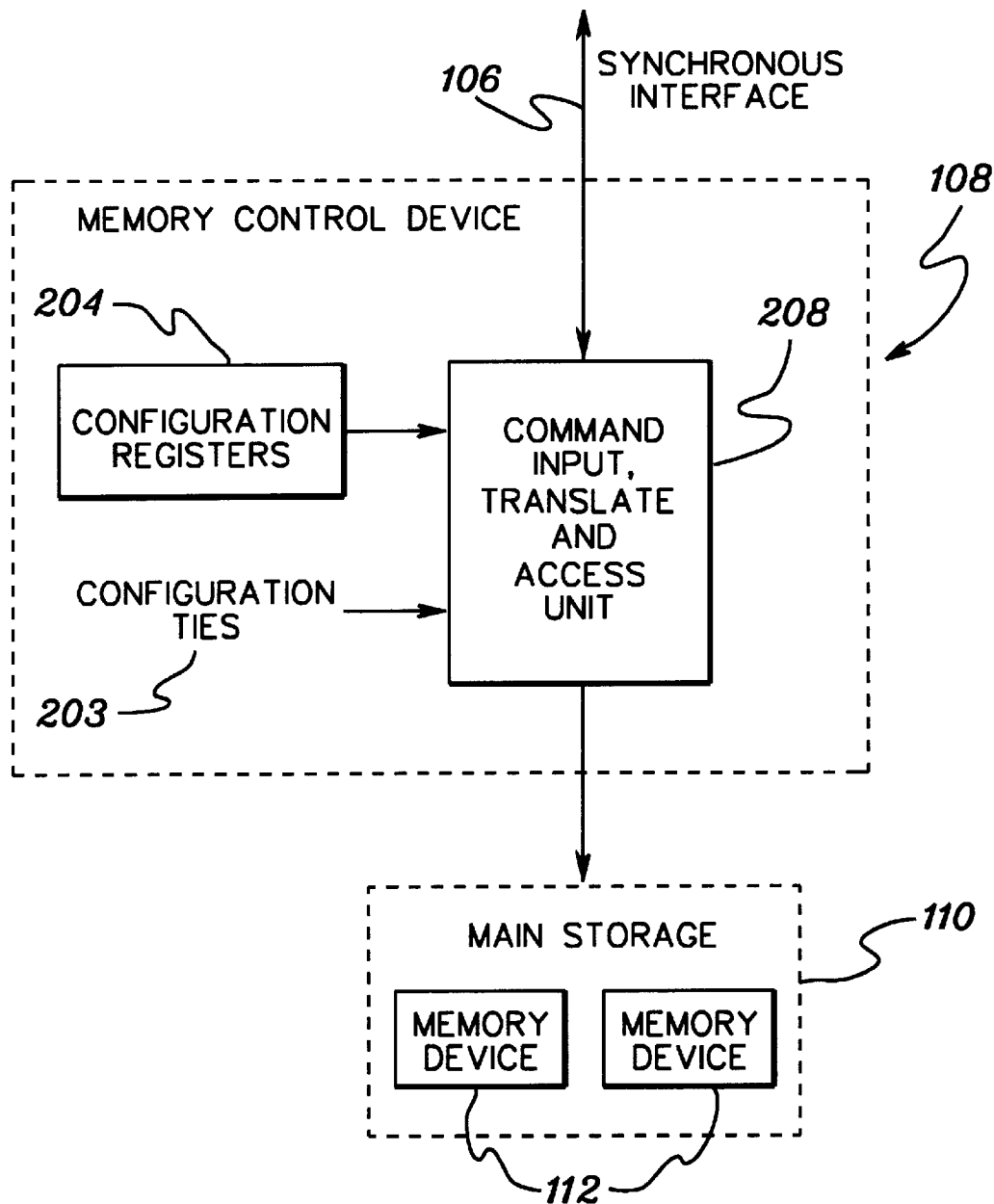
FIG. 2b depicts another embodiment of the memory control device of FIG. 1, in accordance with the principles of the present invention.

In the above example, a number of the functions performed by memory control device 108 are shown as being performed by separate components, such as command input unit 200, translator 202 and access unit 206. However, this is only one example. All of the functions performed by these, as well as other units within the device, can be included in one component 208 (FIG. 2b) or any combination thereof without departing from the spirit of the present invention.

Figure 3:
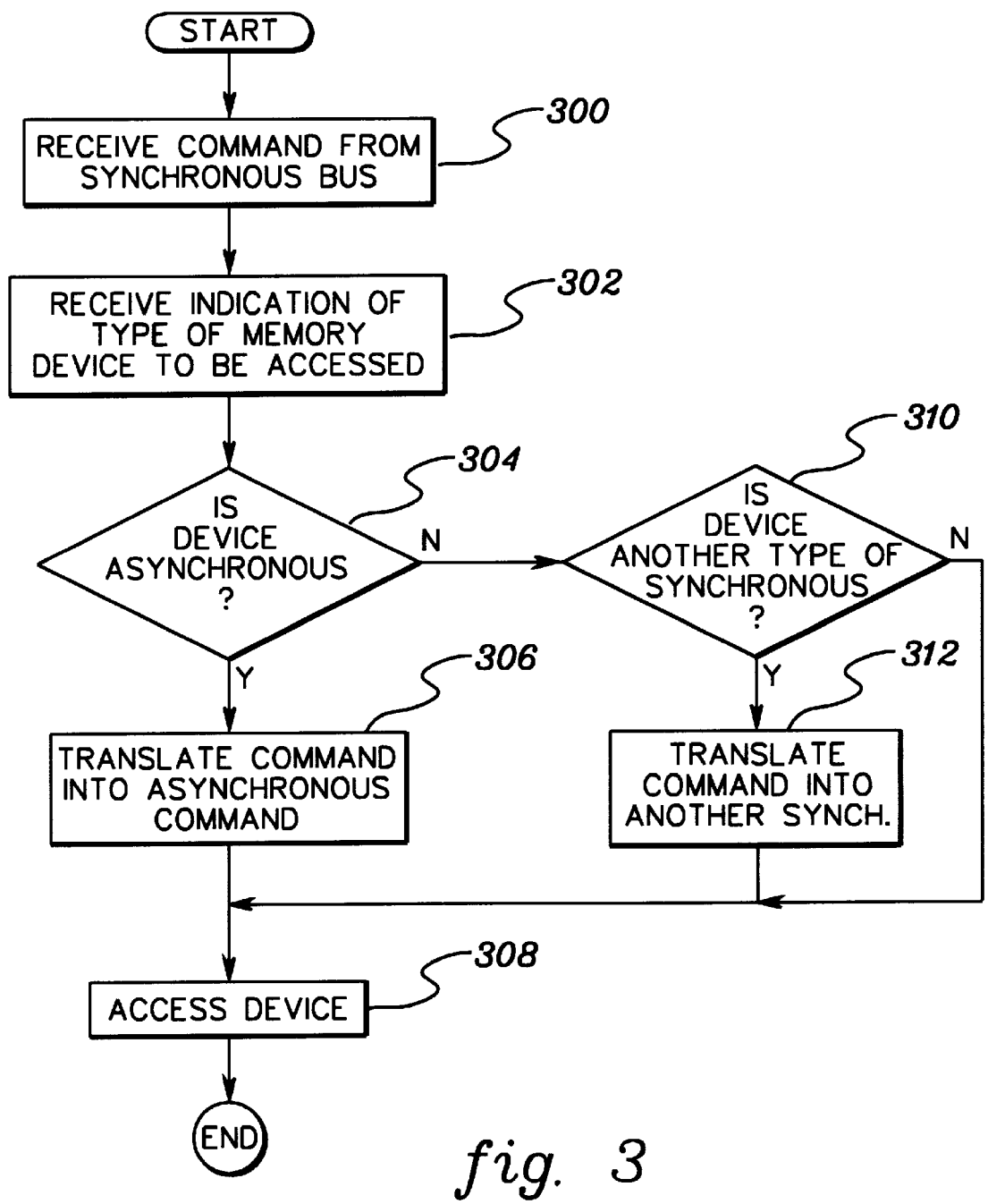
FIG. 3 depicts one embodiment of the logic associated with an operational example of the memory control device of FIG. 1, in accordance with the principles of the present invention.

One operational example of the memory control device of the present invention is described below with reference to FIG. 3. In one embodiment, a command in a synchronous format is provided to the memory control device of the present invention via synchronous bus 106, STEP 300. Additionally, the memory control device is provided with an indication of the type of memory device to be accessed (e.g., synchronous or asynchronous) via the configuration ties, STEP 302. A determination is made as to whether the device is of a synchronous type or an asynchronous type, INQUIRY 304. If the device is asynchronous, then the synchronous command is translated into an asynchronous command, STEP 306, as described in detail below. Thereafter, the asynchronous memory device is accessed with the translated command, STEP 308.

Returning to INQUIRY 304, if, however, the specified device to be accessed is synchronous, ("no" in INQUIRY 304), then a further determination is made as to whether the synchronous device is of a type that differs from the synchronous bus, INQUIRY 310. For example, if the synchronous bus is of an SDRAM architecture and the device is RAMBUS®, then the command is translated from SDRAM to RAMBUS®, STEP 312. Thereafter, the device is accessed with the translated command, STEP 308.

However, if the device is not of a differing type than the bus, then no translation is necessary. Thus, the synchronous command is directly used to access the specified memory device.

Figure 4:
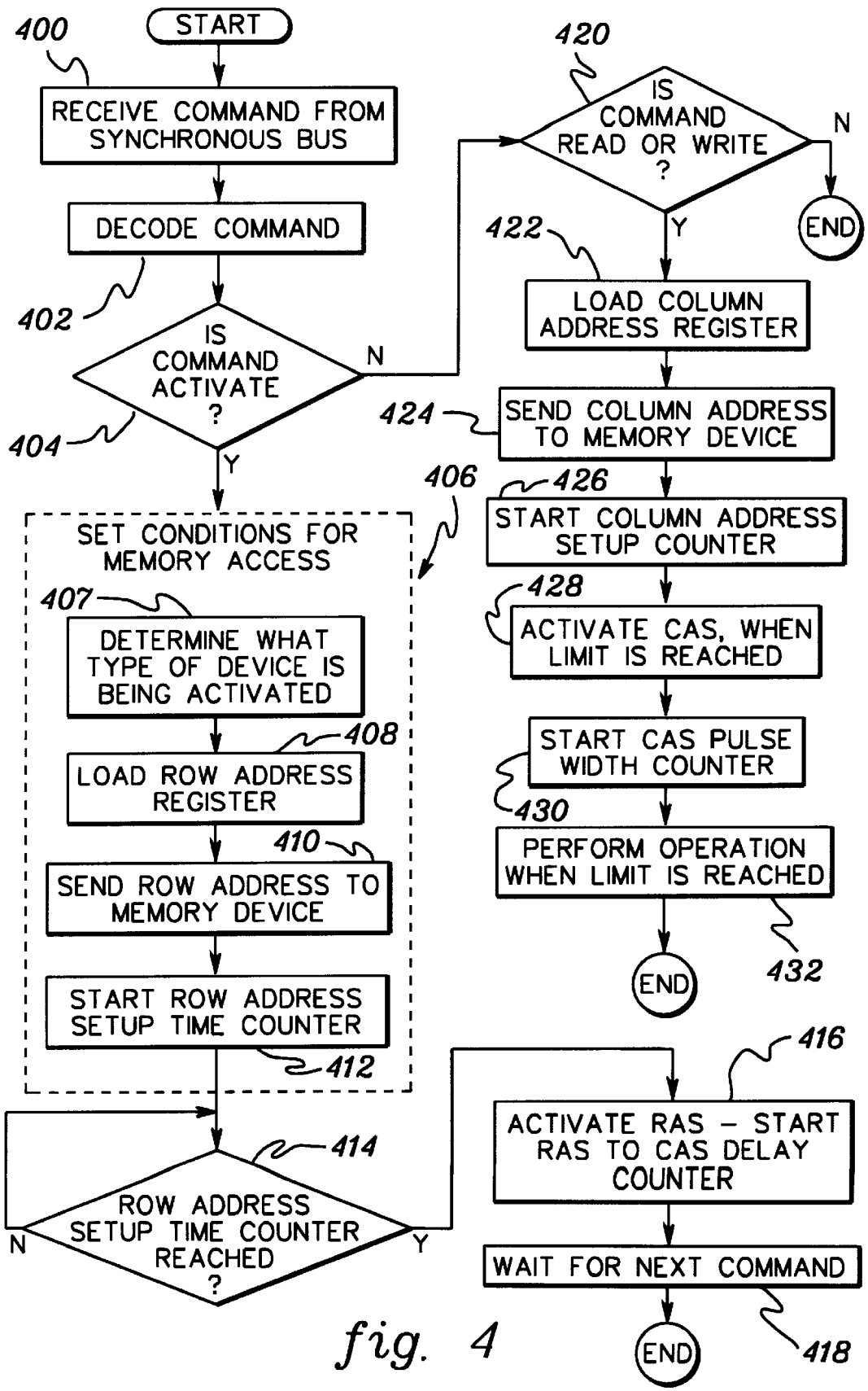
FIG. 4 depicts another example of the logic associated with an operational example of the memory control device of FIG. 1, in accordance with the principles of the present invention.

A more specific operational example of the memory control device of the present invention is described below with reference to FIG. 4. In this particular example, three memory access operations are discussed, including activate, read (FETCH) and write (STORE).

Initially, a command in a synchronous format is received by the memory control device of the present invention, via the synchronous bus, STEP 400. Thereafter, the command is decoded in order to obtain the command code and the memory address (including its various components), STEP 402. A determination is made as to whether the command is an "activate" command, INQUIRY 404. If the command code indicates that the operation to be performed is an activation of the memory device, then conditions are set for the memory access, STEP 406. For example, the translation from the synchronous command to an asynchronous command is performed, if the device to be accessed is an asynchronous device.

In particular, in one example, a determination is made as to whether a synchronous or an asynchronous memory device is to be accessed, STEP 407. This is determined from, for instance, configuration parameters provided by the configuration ties, which indicate, for example, what particular type of memory device is to be accessed (e.g., SDRAM, DRAM, EDO, fast page mode, etc.), and the size of that memory device. Additionally, other configuration parameters corresponding to the device to be accessed (such as access, addressing, timing and address setup information) are obtained from the programmable configuration registers. This information is used to load a row address register, located within the memory control device of the present invention, with the proper address for the device to be accessed, STEP 408.

In particular, if the device is an asynchronous device, then the proper address for the asynchronous device is one which has been translated to an asynchronous format. This is accomplished by performing address steering or mapping for the asynchronous device. For example, when particular asynchronous devices are of the same generation as particular synchronous devices, they have the same number of address bits, but typically, the bits for asynchronous devices are in different locations in the address register than the bits for synchronous devices. Thus, steering or translation is performed. As one instance, the bank address passed with the command would be placed in the register in the locations corresponding to the high order row address for an asynchronous device. Similarly, since asynchronous devices typically have one less bank than synchronous devices, the chip select address provided with the command would be placed in the locations corresponding to a bank address.

If, however, the device is synchronous, then a further determination is made to see whether the device is of a different type than the bus. If so, then translation is performed from the one type of synchronous architecture to the other in a similar manner to that above. If the bus and the device correspond to the same synchronous architecture, then no translation is necessary and the row address is merely loaded into the row address register, STEP 408.

Subsequent to loading the row address (including performing any necessary translation), access of the memory device is commenced. For example, the row address is sent to the particular memory device to be accessed on the next clock cycle, STEP 410. Thereafter, timing parameters are set based on performance considerations. For instance, the row address setup time counter is started, STEP 412, which at its limit, indicates how many cycles the address is to be valid. In one example, the row address setup time limit is located in an array access controls located within the memory device of the present invention, and has a default value of 1 (set at IPL) for a read command and a default value of 0 for a write command. In other embodiments, these values can be adjusted based on performance considerations.

Next, a determination is made as to whether the limit set for the row address setup time counter has been reached, INQUIRY 414. When it has been reached, the row address strobe (RAS) signal to the memory device is activated in order to begin the physical access of the memory, STEP 416. Along with activating the RAS signal, the RAS to CAS (column address strobe) delay counter (tRCD) is started, which is also located in the array access controls. The tRCD is used to prevent early activation of the CAS signal. If a command, such as a STORE or FETCH, is received before the tRCD limit is reached, the command is held until the array access controls identify that the limit has been satisfied. In one example, the tRCD is set to 2, at IPL.

Thereafter, the array access controls waits for the next command to be received from the synchronous interface, STEP 418. In this one particular example, the next command is either a STORE (WRITE) or a FETCH (READ) command. However, as described above, many other commands can also be accepted. The use of the STORE and FETCH commands is only for illustrating one operational example of the present invention.

When the command is received from the synchronous bus, STEP 400, it is decoded, as described above, STEP 402. Then, a determination is made as to whether the command is an activate command, INQUIRY 404. If the command is not an activate command, then a determination is made as to whether the command is a READ (FETCH) or a WRITE (STORE), INQUIRY 420. In this particular example, the command is a STORE or a FETCH, and therefore, a column address register located within the memory control device of the present invention is loaded, STEP 422. Similar to loading the row address register, it is during this time that any necessary translation is performed, as described above.

Subsequent to loading the column address register, the column address is provided to the memory device to be accessed, STEP 424. Additionally, if the command is a STORE command, then the data to be written is also provided. Further, the column address setup counter is started, STEP 426. The column address setup limit is set at IPL (to, e.g., 1) and indicates when the CAS is to be activated. When the setup limit is reached, the CAS is activated, STEP 428.

In addition to activating the CAS, the CAS pulse width counter is started, STEP 430. The CAS pulse width indicates the width of the CAS signal. The limit is set at IPL time, and is generally between 1 and 8 cycles. For example, for a read operation, the limit may be set to 2, and for a write operation, it may be set to 1. When the limit is reached, the operation represented by the command is performed, STEP 432. For instance, if the operation is a STORE operation, then the data is written to the memory device at the address previously determined. If, however, the operation is a FETCH operation, then the data is retrieved from the memory device and provided to the system memory controller via the synchronous bus.

Described above is a technique in which the memory control device of the present invention converts a synchronous command to an asynchronous command in order to access asynchronous memory devices. The memory control device of the present invention allows asynchronous memory devices to be used with a synchronous memory bus in such a way that emulates, for the system memory controller, synchronous memory devices. That is, the use of asynchronous memory devices is transparent to the system memory controller.

Emulation of synchronous memory devices is provided by matching the speed of, for instance, the DRAM technology supported by the memory control device to that of the synchronous data interface of the system memory controller. However, the memory control device is to be flexible and to be able to support different timings and modes of operation.

In accordance with the principles of the present invention, the different modes of operation include, for example:

DRAM Burst Two, two interleaves, four one bank extents (An extent is an independently addressable, controllable unit of memory.)

DRAM Burst Four, four interleaves, two one bank extents

Page Mode Burst Two, one interleave, four one bank extents

Page Mode Burst Four, one interleave, four one bank extents

Page Mode Burst Four, two burst two interleaves, two extents

Page Mode Burst Eight, two burst four interleaves, two extents

Synchronous DRAM Dual Bank Emulation Mode

All of the above modes of operation (and others) can be supported in one implementation of the present invention. In particular, a design is implemented in which any one of the modes can be used by simply supplying the necessary information for a particular mode (e.g., memory type, burst type, number of extents, number of interleaves) to the programmable configuration registers and/or to the configuration ties. This information is then used to program the design for the particular mode to be used.

Figure 5A:
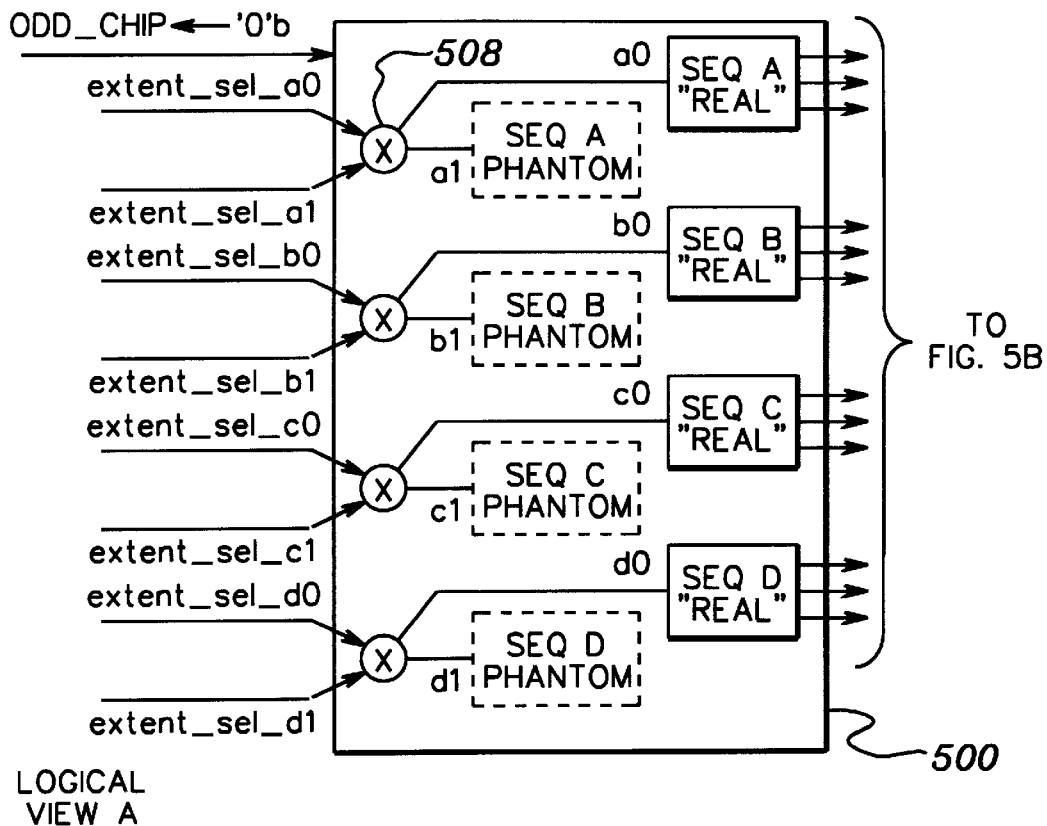
FIGS. 5a–5c depict one embodiment of two memory control devices of the present invention working together to provide support for a plurality of modes of memory operation.
Figure 5A:
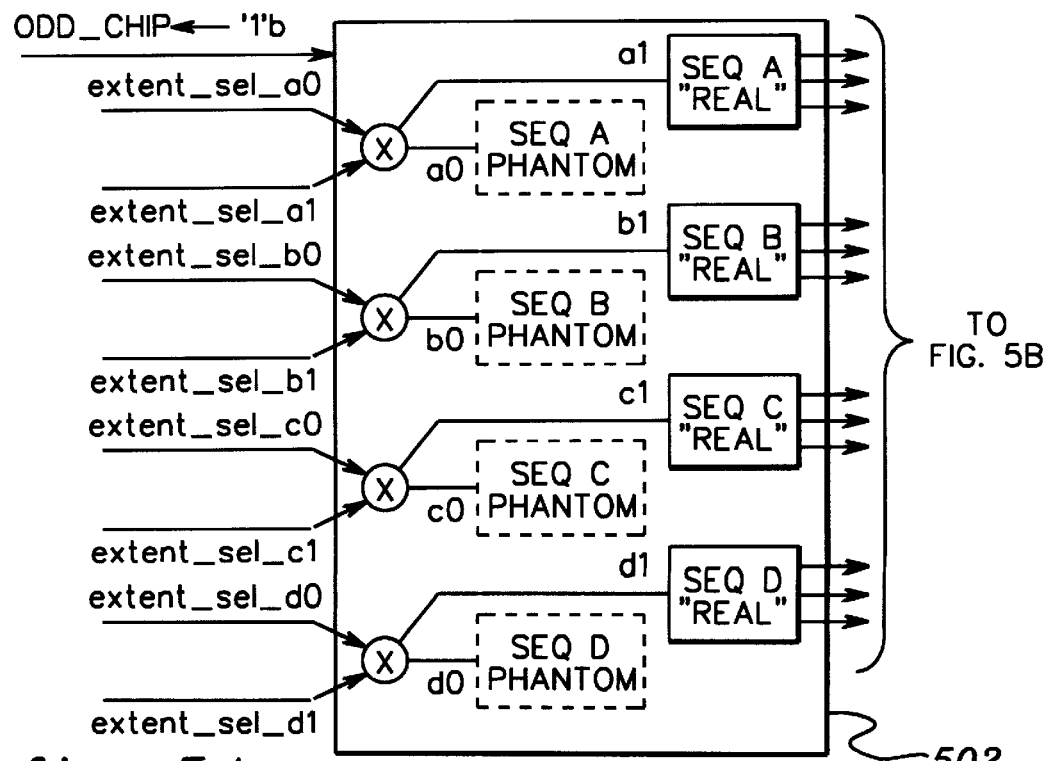
Figure 5B:
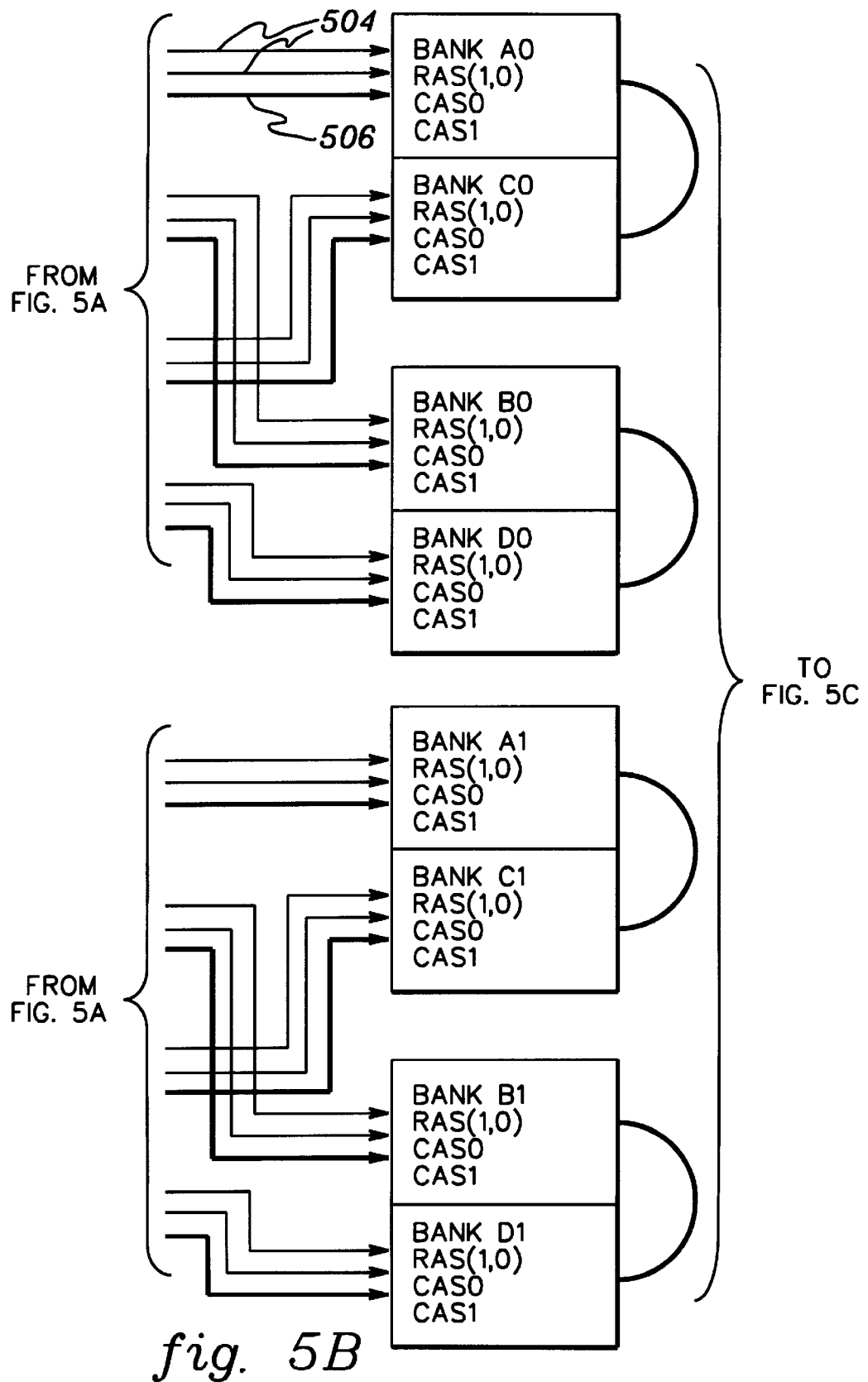
Figure 5C:
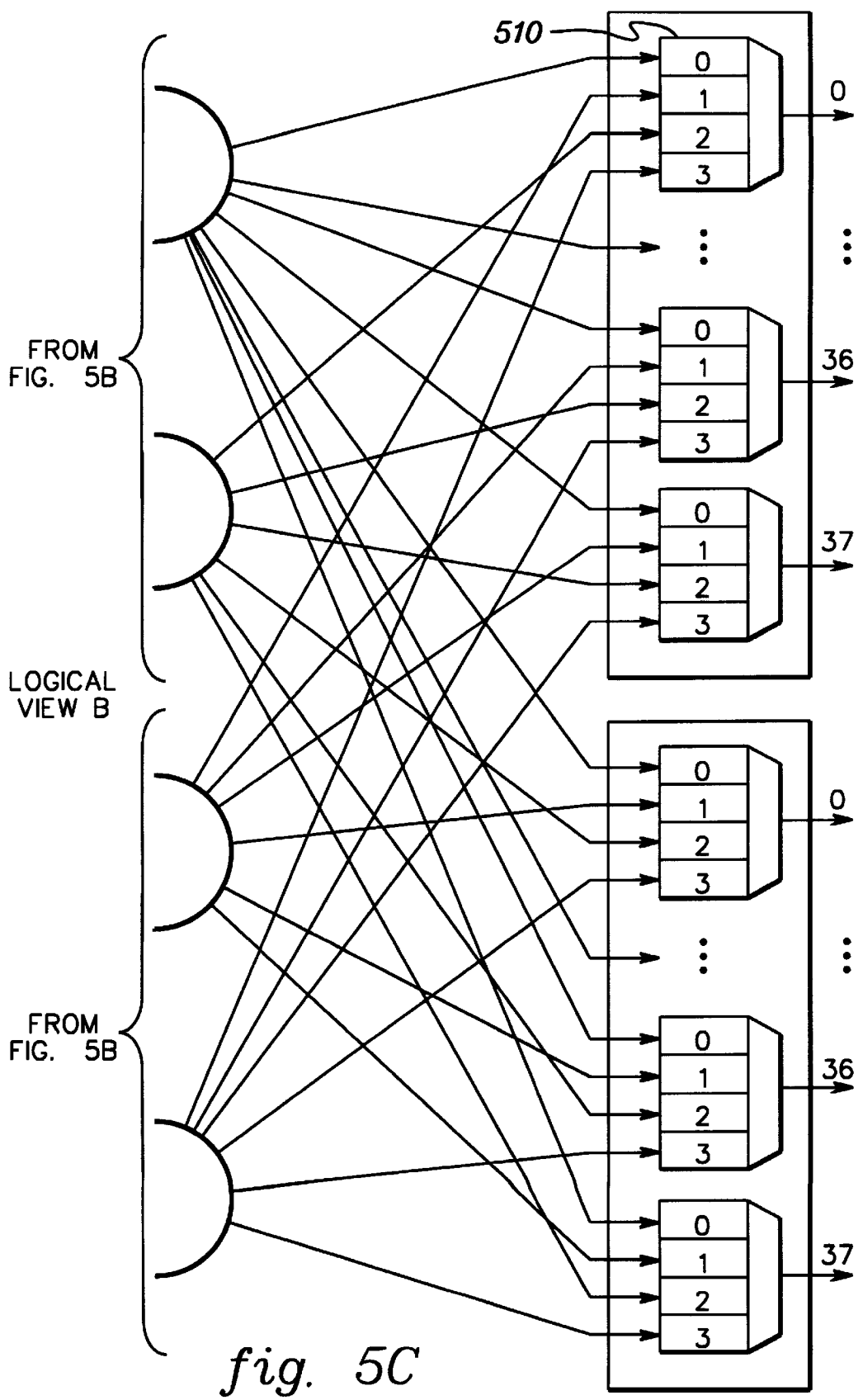

One example of an implementation that can support each of the above modes is depicted in FIGS. 5a–5c. The implementation in FIGS. 5a–5c is a tandem chip design, in which each of the two chips includes a memory control device of the present invention. In particular, a first memory control device 500 and a second memory control device 502 are shown in two different logical views, Logical View A (FIG. 5a) and Logical View B (FIG. 5c). Logical View A depicts the addressing within the device and Logical View B depicts the dataflow, which indicates where the data is going. The dataflow is set such that the speed of the DRAM technology being supported by the memory control device is matched to the synchronous interface of the system memory controller. In this manner, the use of the asynchronous devices is transparent to the system memory controller, since the asynchronous devices, in accordance with the principles of the present invention, emulate synchronous devices.

Each memory control device 500, 502 includes a plurality of real sequencers and a plurality of phantom sequencers. A real sequencer has physical control and addressing that is output from the memory control device, while a phantom sequencer is aware that physical control and addressing for an extent is being provided by another chip of the tandem chip pair and operates in lock step with the other tandem chip for timing control of the dataflow function. In one example, each of the sequencers includes the command input, translation and access functions described in detail above.

Each of the real and phantom sequencers selectively receives as input an extent select address (which is part of the address provided by the system memory controller via the synchronous bus). Each extent select address is input to a switch 508 within each of the memory control devices, and it is the switch which indicates whether the real or phantom sequencer of a particular device is to receive the address. For example, extent_sel_a0 is input to memory control device 500 and 502. If extent_sel_a0 is active, then the switch will provide the address (and data) to SEQ A REAL of device 500.

Each of the real sequencers is further coupled to a bank of a memory device (FIG. 5b). In this one example, the memory devices are EDO DRAM devices, and each real sequencer is coupled via two wires 504 and a bus 506. Bus 506 provides the address and data information to be stored or retrieved from the bank. For the above example, SEQ A REAL will provide the data to BANK A0 of the memory devices.

Logical View B (FIG. 5c) of the memory control devices specifically shows the wiring of where the data would be placed. The numbers in boxes 510 show the interleaves. For instance, all data corresponding to interleave 0 would be output at the same time. This view shows the dataflow portion of the devices. The dataflow portion performs multiplexing and data speed matching between the memory interface and the system interface under control of the sequencers.

As described in detail above, a memory control device is provided which allows the system memory controller to be designed in a single preferred high performance architecture (such as a synchronous architecture, one example of which is the SDRAM architecture), yet allows the access of memory devices corresponding to the synchronous architecture of the system controller, as well as devices corresponding to an asynchronous architecture or a different synchronous architecture. The asynchronous architecture includes, for instance, various types of DRAM devices.

The memory control device of the present invention converts the fixed synchronous protocol into the protocol required of any of the various asynchronous protocols or different synchronous protocols. The supporting logic in the memory control device insures that slower DRAM types are sufficiently buffered, interleaved, and controlled to mask their individual shortfalls on the high performance controller memory bus. For these benefits, larger increments of memory making up fewer basic units that can be independently operated are used. However, the basic units thus created perform equivalently to a basic unit made up of more expensive DRAM types.

The memory control device of the present invention advantageously provides optimum performance, cost and stability. Larger capacity systems benefit the most from the present invention, since the larger total number of DRAMs on the controller bus permit the structuring of larger units in sufficient numbers, such that the data bus remains fully utilized. Further, the savings in DRAM premiums over a large number of devices easily pays for the added costs of the memory control device, typically in just the first or second unit plugged. Further, plugs produce lower total memory system costs, since the addition is with cheaper devices. Thus, the larger the capacity, the greater the savings.

The flow diagrams depicted herein are just exemplary. There may be many variations to these diagrams or the steps described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A memory control device, comprising:
   a translator adapted to translate at least a part of a command received in a synchronous format from said synchronous format to an asynchronous format; and
   an access unit coupled to said translator and adapted to provide access to an asynchronous memory device using said command in said asynchronous format.

2. The memory control device of claim 1, wherein said memory control device receives said command in said synchronous format from a synchronous interface coupled to said memory control device.

3. The memory control device of claim 1, further comprising:
means for providing one or more configuration parameters to said translator, said one or more configuration parameters defining for said translator said asynchronous format corresponding to said asynchronous memory device.

4. The memory control device of claim 1, wherein said synchronous format corresponds to the format of a synchronous dynamic random access memory (SDRAM).

5. The memory control device of claim 1, wherein said translator and said access unit are included in one component.

6. The memory control device of claim 1, wherein said command comprises an address and said translator maps said address from said synchronous format to said asynchronous format.

7. The memory control device of claim 6, wherein said address comprises one or more portions, and wherein the mapping of said address comprises loading said one or more portions into an address register, wherein an ordering of said one or more portions in said address register is based on said asynchronous format.

8. The memory device of claim 1, wherein said asynchronous memory device comprises a dynamic random access memory (DRAM) device.

9. The memory control device of claim 8, wherein said dynamic random access memory (DRAM) device comprises one of a fast page mode DRAM device, an Extended-Data-Out (EDO) memory device, and a hyperpage mode DRAM device.

10. A computing apparatus comprising:
a processor;
an interface coupled to said processor that receives, from said processor, a command having a synchronous format;
a memory control device coupled to said interface to receive said command from said interface and to translate at least a portion of said command from said synchronous format to an asynchronous format; and
one or more asynchronous memory devices coupled to said memory control device, wherein one of said one or more asynchronous memory devices is accessible by said command in the asynchronous format.

11. The computing apparatus of claim 10, wherein said memory control device comprises means for providing one or more configuration parameters to said memory control device, said one or more configuration parameters defining for said memory control device said asynchronous format the at least a portion of said command is to be translated into.

12. The computing apparatus of claim 10, further comprising a system memory controller coupled to said processor and said interface, wherein said system memory controller receives said command from said processor and provides said command to said interface, and wherein the translation of said command by said memory control device is transparent to said system memory controller.

13. A method for accessing asynchronous memory devices, said method comprising:
translating at least a part of a command received in a synchronous format from said synchronous format to an asynchronous format; and
accessing an asynchronous memory device using said command in said asynchronous format.

14. The method of claim 13, further comprising:
receiving said command to be translated via a synchronous interface.

15. The method of claim 13, wherein said translating comprises using one or more configuration parameters to define said asynchronous format corresponding to the asynchronous memory device.

16. The method of claim 13, further comprising outputting data retrieved from said asynchronous memory device in said synchronous format.

17. The method of claim 13, wherein said command comprises an address and said translating comprises mapping said address from said synchronous format to said asynchronous format.

18. The method of claim 17, wherein said address comprises one or more portions, and wherein said mapping comprises loading said one or more portions into an address register, wherein an ordering of said one or more portions in said address register is based on said asynchronous format.

19. An apparatus for controlling access to memory devices, comprising:
a memory controller configured for a single memory type architecture; and
a memory control device coupled to said memory controller, wherein said memory control device accesses a first memory device having said single memory type architecture and a second memory device having another memory type architecture.

20. The apparatus of claim 19, wherein said memory control device comprises a translator adapted to translate at least a portion of a command having a first format corresponding to said single memory architecture from said first format to a second format corresponding to said another memory architecture.

21. The apparatus of claim 19, wherein said single memory architecture comprises a synchronous architecture and said another memory architecture comprises one of an asynchronous architecture and a different synchronous architecture.

22. The apparatus of claim 21, wherein said synchronous architecture comprises a synchronous dynamic random access memory architecture and wherein said different synchronous architecture comprises one of a RAMBUS® architecture and a SYNCLINK® architecture.

23. The apparatus of claim 21, wherein said asynchronous architecture comprises a dynamic random access memory (DRAM) architecture.

24. The apparatus of claim 23, wherein said DRAM architecture comprises one of a fast page mode DRAM architecture, an Extended-Data-Out (EDO) architecture, and a hyperpage mode DRAM architecture.

25. A memory control device, comprising:
a first unit that receives a synchronous memory access command in a first synchronous format; and
a second unit coupled to said first unit that accesses one of an asynchronous memory device and a memory device in a second synchronous format using said synchronous memory access command.

26. The memory control device of claim 25, wherein one of said first unit and said second unit comprises a translator adapted to translate at least a portion of said synchronous memory access command from said first synchronous format to an asynchronous format prior to access of said asynchronous memory device.

27. The memory control device of claim 25, wherein one of said first unit and said second unit comprises a translator adapted to translate at least a portion of said synchronous memory access command from said first synchronous format to said second synchronous format prior to access of said memory device in said second synchronous format.

28. Apparatus for controlling memory, comprising:

a memory device of a first memory type architecture; and a memory control device coupled to the memory device and adapted to translate at least a part of a command received in a format corresponding to a second memory type architecture to a format corresponding to said first memory type architecture, said memory control device further adapted to provide access to the memory device using said command in said format corresponding to said first memory type architecture;

wherein the memory device and memory control device together emulate a memory device of the second memory type architecture.

* * * * *

UNITED STATES PATENT AND TRADEMARK OFFICE
CERTIFICATE OF CORRECTION

PATENT NO. : 6,047,361
DATED : April 4, 2000
INVENTOR(S) : Ingenio et al.

It is certified that error appears in the above-identified patent and that said Letters Patent are hereby corrected as shown below:

Col. 1, line 13, delete "asynchronous".

Signed and Sealed this

Third Day of April, 2001

*Attest:*

NICHOLAS P. GODICI

*Attesting Officer*     *Acting Director of the United States Patent and Trademark Office*